United States Patent
Ichikawa et al.

(10) Patent No.: US 7,041,396 B2
(45) Date of Patent: May 9, 2006

(54) MAGNETIC RECORDING MEDIUM

(75) Inventors: Tomohiro Ichikawa, Kanagawa (JP); Naoto Murao, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 40 days.

(21) Appl. No.: 10/937,308

(22) Filed: Sep. 10, 2004

(65) Prior Publication Data
US 2005/0079389 A1    Apr. 14, 2005

(30) Foreign Application Priority Data
Sep. 16, 2003  (JP)  ............................. 2003-323211

(51) Int. Cl.
*G11B 5/708*  (2006.01)

(52) U.S. Cl. .................................... 428/840.6; 428/844
(58) Field of Classification Search ............ 428/840.6, 428/844, 844.3

See application file for complete search history.

(56) References Cited

U.S. PATENT DOCUMENTS

| | | | |
|---|---|---|---|
| 6,652,953 B1 * | 11/2003 | Komatsu et al. | 428/141 |
| 6,805,942 B1 * | 10/2004 | Doushita et al. | 428/844.8 |
| 6,821,602 B1 * | 11/2004 | Kurose et al. | 428/840.3 |

* cited by examiner

*Primary Examiner*—Stevan A. Resan
(74) *Attorney, Agent, or Firm*—Sughrue Mion, PLLC

(57) ABSTRACT

Provided is a magnetic recording medium affording good head contact and high output in addition to excellent head abrasion characteristics acceptable to high data transmission rates. The magnetic recording medium comprises a nonmagnetic layer comprising a nonmagnetic powder and a binder and a magnetic layer comprising a ferromagnetic powder and a binder in this order on a support. Said magnetic layer comprises an abrasive in a quantity of 2 to 5 weight percent with respect to the ferromagnetic powder, the number of protrusions having a height of 3 to 7 nm per 23,000 $\mu m^2$ of a surface of the magnetic layer, measured by a non-contact three-dimensional structure analyzing microscope, ranges from 50 to 200, and said magnetic layer has a microindentation hardness ranging from 40 to 80 $kg/mm^2$ at a load of 6 mgf.

6 Claims, No Drawings

MAGNETIC RECORDING MEDIUM

FIELD OF THE INVENTION

The present invention relates to a magnetic recording medium affording good head contact and high output in addition to excellent head abrasion characteristics acceptable to high data transmission rates.

BACKGROUND OF THE INVENTION

Helical recording systems have been employed in broadcast VTRs to achieve high data transmission rates. In particular, the increasing popularity of high image quality broadcasts such as high vision broadcasts and digital ground wave broadcasts has required increasingly higher data transmission rates. Helical recording systems are even employed in data storage systems such as DTF1 and DTF2 to achieve high data transmission rates.

Achieving high data transmission rates requires increasing the speed of drum rotation, developing high-output tapes, and the like. Decreasing the space between tape and head, that is, rendering the surface smooth, is an extremely effective method of achieving high output. However, when the space between tape and head is reduced, the abrasive present on the tape surface contacts the head with increased frequency, thus abrading the head. Further, even when the drum rotation rate is increased, the frequency of contact between head and abrasive increases, resulting in substantial wear on the head. Accordingly, it is important to design a recording and reproduction system so as to reduce head abrasion to achieve high data transmission rates.

Since the relative speed between the tape and the head is high in helical recording systems, stable contact between the tape and the head, known as secure head contact, is known to be extremely important. When there is a small gap between the drum and head, the tape is sometimes drawn into the gap as the drum rotates. When the tape is drawn into the gap between drum and head, the spacing loss between tape and head increases and output drops. In particular, when the drum rotation rate increases, the amount of tape drawn into the gap increases, spacing loss increases, and head contact deteriorates. Accordingly, a design ensuring head contact, specifically, the design of tape stiffness, has assumed even greater importance.

Methods such as increasing the drawing factor during film formation are known to effectively increase the Young's modulus in the width direction of the base to ensure head contact. As specific examples of increasing the Young's modulus in the width direction of the base, Japanese Unexamined Patent Publication (KOKAI) Showa Nos. 50-46303, 54-34206, 62-234233, 63-197643, and 63-212549, and Japanese Unexamined Patent Publication (KOKAI) Heisei Nos. 2-20924 and 4-49515 propose techniques employing polyethylene terephthalate (reinforced PET) or polyethylene-2,6-naphthalate (PEN) with a greater than normal Young's modulus in the width direction; aromatic polyamide (aramid); and compound polyester. However, even when these techniques are employed to adjust the stiffness to within what is considered to be the optimal region, there remains a need for better head contact.

It is an object of the present invention to provide a magnetic recording medium affording good head contact and high output in addition to excellent head abrasion characteristics acceptable to high data transmission rates.

SUMMARY OF THE INVENTION

The aforementioned object of the present invention can be achieved by;
a magnetic recording medium comprising a nonmagnetic layer comprising a nonmagnetic powder and a binder and a magnetic layer comprising a ferromagnetic powder and a binder in this order on a support, wherein
said magnetic layer comprises an abrasive in a quantity of 2 to 5 weight percent with respect to the ferromagnetic powder,
the number of protrusions having a height of 3 to 7 nm per 23,000 $\mu m^2$ of a surface of the magnetic layer, measured by a non-contact three-dimensional structure analyzing microscope, ranges from 50 to 200, and
said magnetic layer has a microindentation hardness ranging from 40 to 80 $kg/mm^2$, approximately 0.39 to 0.78 GPa, at a load of 6 mgf.

The present invention provides a magnetic recording medium affording good head contact and high output in addition to excellent head abrasion characteristics.

The present invention will be described in greater detail below.

The magnetic recording medium of the present invention is a magnetic recording medium comprising a nonmagnetic layer comprising a nonmagnetic powder and a binder and a magnetic layer comprising a ferromagnetic powder and a binder in this order on a support. In the magnetic recording medium of the present invention, the magnetic layer comprises an abrasive in a quantity of 2 to 5 weight percent with respect to the ferromagnetic powder. When the quantity of abrasive in the magnetic layer falls within the stated range, a magnetic recording medium having excellent head abrasion characteristics acceptable to high data transmission rates can be obtained. In the present invention, the term "excellent head abrasion" refers to, for example, head abrasion of equal to or less than 1.0 $\mu m$ when a virgin tape is run for 100 hours.

When the quantity of abrasive in the magnetic layer exceeds 5 weight percent, head abrasion exceeds 1.0 $\mu m$ when a virgin tape is run for 100 hours. By contrast, when the quantity of abrasive is less than 2 weight percent, head clogging and powder dropout from the magnetic layer due to high-speed sliding become problems. In the present invention, the quantity of abrasive contained in the magnetic layer preferably falls within a range of 3 to 4 weight percent with respect to the ferromagnetic powder.

In the magnetic recording medium of the present invention, the magnetic layer has a microindentation hardness ranging from 40 to 80 $kg/mm^2$, approximately 0.39 to 0.78 GPa, at a load of 6 mgf. In this manner, in the magnetic recording medium of the present invention, the magnetic layer has suitable flexibility, ensuring good head contact. The microindentation hardness at a load of 6 mgf of the magnetic layer preferably falls within a range from 50 to 70 $kg/mm^2$, approximately 0.49 to 0.68 GPa. The microindentation hardness can be measured with a Microindentation Tester ENT-1100a made by Elionix Co. When the microindentation hardness at a load of 6 mgf is less than 40 $kg/mm^2$, approximately 0.39 GPa, the magnetic layer is excessively soft and debris (powder fallout) occurs due to high-speed sliding against the magnetic head, causing the error rate to increase. Conversely, when the microindentation hardness at a load of 6 mgf exceeds 80 $kg/mm^2$, approximately 0.78 GPa, the magnetic layer becomes excessively hard, the head tends not to bite into the magnetic layer, and a substantial drop in output results.

A number of methods may be adopted to adjust the microindentation hardness of the magnetic layer to within the above-stated range. Examples of methods of adjusting the microindentation hardness to within the above-stated range include: varying the ratio of the three components of the binder resin in the magnetic layer (polyvinyl chloride—polyurethane—curing agent); varying the P/B ratio (the ratio of inorganic powder such as magnetic powder to binder resin); using a resin incorporating polar groups as binder to increase dispersibility of the ferromagnetic powder; and increasing the modulus of elasticity or glass transition temperature (Tg) of the binder resin. Employing a large amount of lubricant plasticizes the binder and increases calender moldability, permitting control of microindentation hardness. Varying the type and/or quantity of kneading solvent during preparation of the magnetic layer coating liquid to vary the degree of kneading permits adjustment of microindentation hardness. Further, calendering conditions (temperature, pressure, hardness of calender rolls, and the like) can be varied and metal calender rolls can be employed to conduct relatively strong calendering, permitting adjustment of the microindentation hardness of the magnetic layer.

In the magnetic recording medium of the present invention, the magnetic layer is highly flat, with from 50 to 200 protrusions having a height of 3 to 7 nm per 23,000 $\mu m^2$ of the surface thereof, measured by a non-contact three-dimensional structure analyzing microscope. When the number of such protrusions is less than 50, the surface of the magnetic layer becomes excessively flat, the medium tends to adhere to parts, and running properties become highly unstable. When the number of such protrusions exceeds 200, although the medium and head come into stable contact and excellent head contact is ensured, the space between the medium and the head increases and output drops significantly. The above-stated number of protrusions preferably ranges from 70 to 150.

In the present invention, various means may be adopted to keep the number of protrusions on the surface of the magnetic layer within the above-stated range. For example, the number of aggregates of magnetic material capable of forming protrusions may be adjusted by means of the quantity of polar functional groups in the binder resin, the quantity of binder resin, and/or the dispersion time in the disperser to keep the number of protrusions on the surface of the magnetic layer within the above-stated range. Further, the method of dispersion and quantity of carbon black and abrasive in the magnetic layer capable of becoming protrusions can be adjusted to keep the number of protrusions on the surface of the magnetic layer within the above-stated range. Still further, similar to when adjusting the microindentation hardness of the magnetic layer, adjustment is possible by varying calendering conditions such as temperature, pressure, and calender roll hardness.

The magnetic recording medium of the present invention is comprised of a support, a nonmagnetic layer and a magnetic layer provided on one side of the support, and, as needed, a backcoat layer on the other side thereof. Each layer constituting the magnetic recording medium, the components of each layer, and the method of forming each of the layers will be described below.

[Magnetic Layer]

The magnetic layer of the magnetic recording medium of the present invention comprises a ferromagnetic powder and a binder.

The ferromagnetic powder employed in the magnetic layer in the present invention is preferably a ferromagnetic alloy powder comprised primarily of α-Fe. In addition to prescribed atoms, the following atoms can be contained in the ferromagnetic powder: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, Sm, P, Co, Mn, Zn, Ni, Sr, B and the like. Particularly, the incorporation of at least one of the following in addition to α-iron is desirable: Al, Si, Ca, Y, Ba, La, Nd, Sm, Co, Ni and B, further desirably Co, Y, Al, Nd and Sm. The Co content preferably ranges from 0 to 40 atom percent, more preferably from 5 to 35 atom percent, further preferably from 10 to 35 atom percent with respect to Fe. The Y content preferably ranges from 1.5 to 12 atom percent, more preferably from 3 to 10 atom percent, further preferably from 3 to 9 atom percent. The Al content preferably ranges from 1.5 to 13 atom percent, more preferably from 3 to 11 atom percent, further preferably from 4 to 10 atom percent. These ferromagnetic powders may be pretreated prior to dispersion with dispersing agents, lubricants, surfactants, antistatic agents, and the like, described further below. Specific examples are described in Japanese Examined Patent Publication (KOKOKU) Showa Nos. 44-14090, 45-18372, 47-22062, 47-22513, 46-28466, 46-38755, 47-4286, 47-12422, 47-17284, 47-18509, 47-18573, 39-10307, and 46-39639; and U.S. Pat. Nos. 3,026,215, 3,031,341, 3,100,194, 3,242,005, and 3,389,014.

The ferromagnetic powder may contain a small quantity of hydroxide or oxide. Ferromagnetic metal powders obtained by known manufacturing methods may be employed. The following are examples of methods of manufacturing ferromagnetic powders: methods of reduction with compound organic acid salts (chiefly oxalates) and reducing gases such as hydrogen; methods of reducing iron oxide with a reducing gas such as hydrogen to obtain Fe or Fe—Co particles or the like; methods of thermal decomposition of metal carbonyl compounds; methods of reduction by addition of a reducing agent such as sodium boron hydride, hypophosphite, or hydrazine to an aqueous solution of ferromagnetic metal; and methods of obtaining micropowder by vaporizing a metal in a low-pressure inert gas. The ferromagnetic powders obtained in this manner may be subjected to any of the known slow oxidation treatments, such as immersion in an organic solvent followed by drying; the method of immersion in an organic solvent followed by formation of an oxide film on the surface by feeding in an oxygen-containing gas, then drying; and the method of forming an oxide film on the surface by adjusting the partial pressure of oxygen gas and a inert gas without using an organic solvent.

The ferromagnetic powder comprised in the magnetic layer in the present invention preferably has a specific surface area by BET method of 45 to 80 $m^2/g$, more preferably 50 to 70 $m^2/g$. When the specific surface area by BET method is 45 $m^2/g$ or more, noise drops, and at 80 $m^2/g$ or less, surface properties are good. The crystallite size of the ferromagnetic powder comprised in the magnetic layer in the present invention is preferably 80 to 180 Å, more preferably 100 to 180 Å, and further preferably, 110 to 175 Å. The average major axis length of the ferromagnetic powder preferably ranges from 30 to 150 nm, more preferably 30 to 120 nm. The acicular ratio of the ferromagnetic powder preferably ranges from 3 to 15, more preferably from 5 to 12. The saturation magnetization (σs) of the ferromagnetic powder preferably ranges from 100 to 200 $A·m^2/kg$, more preferably from 120 to 180 $A·m^2/kg$.

The moisture content of the ferromagnetic powder preferably ranges from 0.01 to 2 weight percent. The moisture content of the ferromagnetic powder is preferably optimized based on the type of binders. The pH of the ferromagnetic powder is preferably optimized based on the combination of binders employed. The range is usually from 4 to 12, preferably from 6 to 10. As needed, the surface of the ferromagnetic powder may be treated with Al, Si, P, or oxides thereof, and the like to be coated at least a portion thereof. The quantity thereof usually ranges from 0.1 to 10 weight percent with respect to the ferromagnetic powder. It is preferable that a surface treatment is applied, because the adsorption of lubricants such as fatty acids becomes equal to or less than 100 mg/m$^2$. Inorganic ions of soluble Na, Ca, Fe, Ni, Sr, and the like are sometimes incorporated into the ferromagnetic powder. It is basically desirable that these not be present, but characteristics are not particularly affected when the quantity thereof is equal to or less than 200 ppm. Further, there are desirably few pores in the ferromagnetic powder employed in the present invention; the level thereof is preferably equal to or less than 20 volume percent, more preferably equal to or less than 5 volume percent. The shape may be acicular, rice-particle shaped, or spindle-shaped so long as the above-stated characteristics about particle size are satisfied. A low SFD (switching field distribution) of the ferromagnetic powder itself is desirable, and 0.8 or less is preferable. It is preferable to narrow the Hc distribution of the ferromagnetic powder. If the SFD is equal to or less than 0.8, the excellent electromagnetic characteristics and high output are achieved and magnetization reversal is sharp and peak shifts are small, which are suited to high density digital magnetic recording. Methods of narrowing the Hc include improving the particle size distribution of the goethite and preventing sintering between particles in the ferromagnetic powder.

[Nonmagnetic Layer]

Details of the nonmagnetic layer will be described below. In the magnetic recording medium of the present invention, the nonmagnetic layer comprises a nonmagnetic powder and a binder. The nonmagnetic powder may be an inorganic or organic powder. The inorganic powder is usually a nonmagnetic powder. However, in addition to inorganic powders as a nonmagnetic powder, inorganic magnetic powders can be added to the nonmagnetic layer to the extent that electromagnetic characteristics are not substantially affected.

The nonmagnetic powder may be selected from, for example, metal oxides, metal carbonates, metal sulfates, metal nitrides, metal carbides, metal sulfides and the like. Examples of inorganic compounds are α-alumina having an α-conversion rate equal to or higher than 90 percent, β-alumina, γ-alumina, θ-alumina, silicon carbide, chromium oxide, cerium oxide, α-iron oxide, hematite, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particularly desirable due to their narrow particle distribution and numerous means of imparting functions are titanium dioxide, zinc oxide, iron oxide and barium sulfate. Even more preferred are titanium dioxide and α-iron oxide. The particle size of these nonmagnetic powders preferably ranges from 0.005 to 2 μm, but nonmagnetic powders of differing particle size may be combined as needed, or the particle diameter distribution of a single nonmagnetic powder may be broadened to achieve the same effect.

Particularly when the nonmagnetic powder is a granular metal oxide, an average particle diameter equal to or less than 0.08 μm is preferred, and when an acicular metal oxide, an average major axis length equal to or less than 0.3 μm is preferred and equal to or less than 0.2 μm is further preferred. The tap density preferably ranges from 0.05 to 2 g/ml, more preferably from 0.2 to 1.5 g/ml. The moisture content of the nonmagnetic powder preferably ranges from 0.1 to 5 weight percent, more preferably from 0.2 to 3 weight percent, further preferably from 0.3 to 1.5 weight percent. The pH of the nonmagnetic powder usually ranges from 2 to 11, and the pH between 7 to 10 is particular preferred. The specific surface area of the nonmagnetic powder preferably ranges from 1 to 100 m$^2$/g, more preferably from 5 to 80 m$^2$/g, further preferably from 10 to 70 m$^2$/g. The crystallite size of the nonmagnetic powder preferably ranges from 0.004 to 1 μm, further preferably from 0.04 to 0.1 μm. The oil absorption capacity using dibutyl phthalate (DBP) preferably ranges from 5 to 100 ml/100 g, more preferably from 10 to 80 ml/g, further preferably from 20 to 60 ml/100 g. The specific gravity preferably ranges from 1 to 12, more preferably from 3 to 6. The shape may be any of acicular, spherical, polyhedral, or plate-shaped. The Mohs' hardness is preferably equal to or higher than 4 and equal to or less than 10. The stearic acid (SA) adsorption capacity of the nonmagnetic powders preferably ranges from 1 to 20 μmol/m$^2$, more preferably from 2 to 15 μmol/m$^2$, further preferably from 3 to 8 μmol/m$^2$. The surface of these nonmagnetic powders is preferably treated with $Al_2O_3$, $SiO_2$, $TiO_2$, $ZrO_2$, $SnO_2$, $Sb_2O_3$, ZnO and $Y_2O_3$. Those of preference with regard to dispersibility are $Al_2O_3$, $SiO_2$, $TiO_2$, and $ZrO_2$, and $Al_2O_3$, $SiO_2$ and $ZrO_2$ are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Specific examples of nonmagnetic powders suitable for use in the nonmagnetic layer in the present invention are: Nanotite from Showa Denko K. K.; HIT-100 and ZA-G1 from Sumitomo Chemical Co., Ltd.; α-hematite DPN-250, DPN-250BX, DPN-245, DPN-270BX, DPN-500BX, DPN-SA1 and DPN-SA3 from Toda Kogyo Corp.; titanium oxide TTO-51B, TTO-55A, TTO-55B, TTO-55C, TTO-55S, TTO-55D, SN-100, α-hematite E270, E271, E300 and E303 from Ishihara Sangyo Co., Ltd.; titanium oxide STT-4D, STT-30D, STT-30, STT-65C, and α-hematite α-40 from Titan Kogyo K. K.; MT-100S, MT-100T, MT-150W, MT-500B, MT-600B, MT-100F, and MT-500HD from Tayca Corporation; FINEX-25, BF-1, BF-10, BF-20, and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; and sintered products of the same. Particular preferable nonmagnetic powders are titanium dioxide and α-iron oxide.

Mixing carbon black into the nonmagnetic layer achieves the known effects of lowering surface resistivity Rs and reducing light transmittance. Examples of types of carbon black that are suitable for use in the nonmagnetic layer are furnace black for rubber, thermal for rubber, black for coloring and acetylene black. Based on the effect desired, the following characteristics can be optimized in the carbon black in the nonmagnetic layer, and effects may be achieved by using different carbon blacks in combination.

The specific surface area of carbon black employed in the nonmagnetic layer preferably ranges from 100 to 500 m$^2$/g, more preferably from 150 to 400 m$^2$/g and the DBP oil absorption capacity preferably ranges from 20 to 400 ml/100 g, more preferably from 30 to 400 ml/100 g. The average particle diameter of carbon black preferably ranges from 5 to 80 nm, more preferably from 10 to 50 nm, further preferably from 10 to 40 nm. It is preferable for carbon black that the pH ranges from 2 to 10, the moisture content ranges from 0.1 to 10 weight percent and the tap density ranges from 0.1 to 1 g/ml. Specific examples of types of carbon black suitable for use in the present invention are: BLACK PEARLS 2000, 1300, 1000, 900, 800, 880, 700 and VULCAN XC-72 from Cabot Corporation; #3050B, #3150B, #3250B, #3750B, #3950B, #950, #650B, #970B, #850B, MA-600, MA-230, #4000 and #4010 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Lion Akzo Co., Ltd. The carbon black employed can be surface treated with a dispersing agent or the like, grafted with a resin, or a portion of the surface may be graphite-treated. Further, the carbon black may be dispersed with a binder prior to being added to the coating material. These types of carbon black can be employed in a range that does not exceed 50 weight percent with respect to the inorganic powder above and does not exceed 40 weight percent with respect to the total weight of the nonmagnetic layer. These types of carbon black may be employed singly or in combination. The *Carbon Black Handbook* compiled by the Carbon Black Association may be consulted for types of carbon black suitable for use in the present invention.

Based on the objective, an organic powder may be added to the nonmagnetic layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed. As regards binder resins (type and quantity); type and quantity of lubricants, dispersants, and additives; solvents; dispersion methods and the like of the nonmagnetic layer, the techniques known with regard to magnetic layers can be applied.

[Binder]

Conventionally known thermoplastic resins, thermosetting resins, reactive resins and mixtures thereof may be employed as binders used in the present invention. The thermoplastic resins suitable for use have a glass transition temperature of −100 to 150° C., a number average molecular weight of 1,000 to 200,000, preferably from 10,000 to 100,000, and have a degree of polymerization of about 50 to 1,000.

Examples are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane cured resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in the *Handbook of Plastics* published by Asakura Shoten. It is also possible to employ known electron beam-cured resins in individual layers. The above-listed resins may be used singly or in combination. Preferred resins are combinations of polyurethane resin and at least one member selected from the group consisting of vinyl chloride resin, vinyl chloride—vinyl acetate copolymers, vinyl chloride—vinyl acetate—vinyl alcohol copolymers, and vinyl chloride—vinyl acetate—maleic anhydride copolymers, as well as combinations of the same with polyisocyanate.

Known structures of polyurethane resin can be employed, such as polyester polyurethane, polyether polyurethane, polyether polyester polyurethane, polycarbonate polyurethane, polyester polycarbonate polyurethane, and polycaprolactone polyurethane. To obtain better dispersibility and durability in all of the binders set forth above, it is desirable to introduce by copolymerization or addition reaction one or more polar groups selected from among —COOM, —SO$_3$M, —OSO$_3$M, —P=O(OM)$_2$, —O—P=O(OM)$_2$ (where M denotes a hydrogen atom or an alkali metal), —OH, —NR$_2$, —N+R$_3$ (where R denotes a hydrocarbon group), epoxy groups, —SH, and —CN. The quantity of the polar group is preferably from $10^{-1}$ to $10^{-8}$ mol/g, more preferably from $10^{-2}$ to $10^{-6}$ mol/g.

Specific examples of the binders employed in the present invention are VAGH, VYHH, VMCH, VAGF, VAGD, VROH, VYES, VYNC, VMCC, XYHL, XYSG, PKHH, PKHJ, PKHC, and PKFE from Union Carbide Corporation; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated.; Vylon UR8200, UR8300, UR-8700, RV530, and RV280 from Toyobo Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

The binder employed in the nonmagnetic layer and magnetic layer in the present invention is suitably employed in a range of 5 to 50 weight percent, preferably from 10 to 30 weight percent with respect to the nonmagnetic powder or the magnetic powder. Vinyl chloride resin, polyurethane resin, and polyisocyanate are preferably combined within the ranges of: 5 to 30 weight percent for vinyl chloride resin, when employed; 2 to 20 weight percent for polyurethane resin, when employed; and 2 to 20 weight percent for polyisocyanate. However, when a small amount of dechlorination causes head corrosion, it is also possible to employ polyurethane alone, or employ polyurethane and isocyanate alone. In the present invention, when polyurethane is employed, a glass transition temperature of −50 to 150° C., preferably 0 to 100° C., an elongation at break of 100 to 2,000 percent, a stress at break of 0.05 to 10 kg/mm$^2$, approximately 0.49 to 98 MPa, and a yield point of 0.05 to 10 kg/mm$^2$, approximately 0.49 to 98 MPa, are desirable.

The magnetic recording medium of the present invention comprises at least two layers. Accordingly, the quantity of binder; the quantity of vinyl chloride resin, polyurethane resin, polyisocyanate, or some other resin in the binder; the molecular weight of each of the resins forming the magnetic layer; the quantity of polar groups; or the physical characteristics or the like of the above-described resins can naturally be different in the nonmagnetic layer and each of the magnetic layers as required. These should be optimized in each layer. Known techniques for a multilayered magnetic layer may be applied. For example, when the quantity of binder is different in each layer, increasing the quantity of binder in the magnetic layer effectively decreases scratching on the surface of the magnetic layer. To achieve good head touch, the quantity of binder in the nonmagnetic layer can be increased to impart flexibility. However, the magnetic layer has a flexibility so that, on the surface thereof, the microindentation hardness ranges from 40 to 80 kg/mm$^2$, approximately 0.39 to 0.78 GPa, at a load of 6 mgf.

Examples of polyisocyanates suitable for use in the present invention are tolylene diisocyanate, 4,4'-diphenylmethane diisocyanate, hexamethylene diisocyanate, xylylene diisocyanate, napthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co., Ltd.; and Desmodule L, Desmodule IL, Desmodule N and Desmodule HL manufactured by Sumitomo Bayer Co., Ltd. They can be used singly or in combinations of two or more in all layers by exploiting differences in curing reactivity.

[Carbon Black, Abrasive]

Examples of types of carbon black that are suitable for use in the magnetic layer of the present invention are: furnace black for rubber, thermal for rubber, black for coloring and acetylene black. A specific surface area of 5 to 500 m$^2$/g, a DBP oil absorption capacity of 10 to 400 cm$^3$/100 g, an average particle diameter of 5 to 300 nm, a pH of 2 to 10, a moisture content of 0.1 to 10 weight percent, and a tap density of 0.1 to 1 g/cm$^3$ are desirable. Specific examples of types of carbon black employed in the present invention are: BLACK PEARLS 2000, 1300, 1000, 900, 905, 800, 700 and VULCAN XC-72 from Cabot Corporation; #80, #60, #55, #50 and #35 manufactured by Asahi Carbon Co., Ltd.; #2400B, #2300, #900, #1000, #30, #40 and #10B from Mitsubishi Chemical Corporation; CONDUCTEX SC, RAVEN 150, 50, 40, 15 and RAVEN MT-P from Columbia Carbon Co., Ltd.; and Ketjen Black EC from Lion Akzo Co., Ltd. The carbon black employed may be surface-treated with a dispersant or grafted with resin, or have a partially graphite-treated surface. The carbon black may be dispersed in advance into the binder prior to addition to the magnetic coating liquid. These carbon blacks may be used singly or in combination. When employing carbon black, the quantity preferably ranges from 0.1 to 30 weight percent with respect to the magnetic material. In the magnetic layer, carbon black works to prevent static, reduce the coefficient of friction, impart light-blocking properties, enhance film strength, and the like; the properties vary with the type of carbon black employed. Accordingly, the type, quantity, and combination of carbon blacks employed in the present invention may be determined separately for the magnetic layer and the nonmagnetic layer based on the objective and the various characteristics stated above, such as particle size, oil absorption capacity, electrical conductivity, and pH, and be optimized for each layer. For example, the *Carbon Black Handbook* compiled by the Carbon Black Association may be consulted for types of carbon black suitable for use in the magnetic layer in the present invention.

Known materials, primarily with a Mohs' hardness equal to or higher than 6, such as α-alumina having an α-conversion rate equal to or higher than 90 percent, β-alumina, silicon carbide, chromium oxide, cerium oxide, α-iron oxide, corundum, silicon nitride, titanium carbide, titanium oxide, silicon dioxide, and boron nitride and diamond, may be used singly or in combination as abrasives in the present invention. Further, a composite comprising two or more of these abrasives (an abrasive obtained by surface-treating one abrasive with another) may also be used. Although these abrasives may contain compounds and elements other than the main component or element in some cases, there is no change in effect so long as the main component constitutes equal to or higher than 90 weight percent. The average particle diameter of these abrasives preferably ranges from 0.01 to 2 μm, a narrow particle size distribution being particularly desirable for improving electromagnetic characteristics. As needed to improve durability, abrasives of differing particle size may be combined or the same effect may be achieved by broadening the particle diameter distribution even with a single abrasive. A tap density of 0.3 to 2 g/cm$^3$, a moisture content of 0.1 to 5 weight percent, a pH of 2 to 11, and a specific surface area of 1 to 30 m$^2$/g are desirable. The abrasive employed in the present invention may be any of acicular, spherical, or cubic in shape, but shapes that are partially angular have good abrasion properties and are thus preferred. Specific examples: AKP-12, AKP-15, AKP-20, AKP-30, AKP-50, HIT-20, HIT-30, HIT-55, HIT-60A, HIT-70, HIT-80 and HIT-100 from Sumitomo Chemical Co., Ltd.; ERC-DBM, HP-DBM, and HPS-DBM from Reynolds Co.; WA10000 from Fujimi Abrasives Co.; UB20 from Kamimura Kogyo Co., Ltd.; G-5, Chromex U2, and Chromex U1 from Nippon Chemical Industrial Co., Ltd.; TF100 and TF-140 from Toda Kogyo Corp.; Beta Random Ultrafine from Ibidene Co.; and B-3 from Showa-Mining Co., Ltd. As needed, these abrasives may be added to the nonmagnetic layer.

[Additives]

Substances having lubricating effects, antistatic effects, dispersive effects, plasticizing effects, or the like may be employed as additives in the magnetic layer and nonmagnetic layer in the present invention. Examples of additives are: molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; phenylphosphonic acid; α-naphthylphosphoric acid; phenylphosphoric acid; diphenylphosphoric acid; p-ethylbenzenephosphonic acid; phenylphosphinic acid; aminoquinones; various silane coupling agents and titanium coupling agents; fluorine-containing alkylsulfuric acid esters and their alkali metal salts; monobasic fatty acids (which may contain an unsaturated bond or be branched) having 10 to 24 carbon atoms and metal salts (such as Li, Na, K, and Cu) thereof; monohydric, dihydric, trihydric, tetrahydric, pentahydric or hexahydric alcohols with 12 to 22 carbon atoms (which may contain an unsaturated bond or be branched); alkoxy alcohols with 12 to 22 carbon atoms (which may contain an unsaturated bond or be branched); monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty acid esters of monoalkyl ethers of alkylene oxide polymers; fatty acid amides with 8 to 22 carbon atoms; and aliphatic amines with 8 to 22 carbon atoms.

Specific examples of the additives in the form of fatty acids are: capric acid, caprylic acid, lauric acid, myristic acid, palmitic acid, stearic acid, behenic acid, oleic acid, elaidic acid, linolic acid, linolenic acid, and isostearic acid. Examples of esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentylglycol didecanoate, and ethylene glycol dioleyl. Examples of alcohols are oleyl alcohol, stearyl alcohol, and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in *A Guide to Surfactants* (published by Sangyo Tosho K.K.). These lubricants, antistatic agents and the like need not be 100 percent pure and may contain impurities, such as isomers, unreacted material, by-products, decomposition products, and oxides in addition to the main components. These impurities are preferably comprised equal to or less than 30 weight percent, and more preferably equal to or less than 10 weight percent.

The lubricants and surfactants suitable for use in the present invention each have different physical effects. The type, quantity, and combination ratio of lubricants producing synergistic effects should be optimally set for a given objective. It is conceivable to control bleeding onto the surface through the use of fatty acids having different melting points in the nonmagnetic layer and the magnetic layer; to control bleeding onto the surface through the use of esters having different boiling points, melting points, and polarity; to improve the stability of coatings by adjusting the quantity of surfactant; and to increase the lubricating effect by increasing the amount of lubricant in the nonmagnetic layer. The present invention is not limited to these examples. Generally, a total quantity of lubricant ranging from 0.1 to 50 weight percent, preferably from 2 to 25 weight percent with respect to the ferromagnetic powder in the magnetic layer or the nonmagnetic powder in the nonmagnetic layer is preferred.

All or some of the additives used in the present invention may be added at any stage in the process of manufacturing the magnetic and nonmagnetic coating liquids. For example, they may be mixed with the magnetic material before a kneading step; added during a step of kneading the magnetic material, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering (thermal pressure treatment with calendar rolls) or making slits. Known organic solvents may be employed in the present invention. For example, the solvents described in Japanese Unexamined Patent Publication (KOKAI) Showa No. 6-68453 may be employed.

[Layer Structure]

In the magnetic layer of the present invention, the support preferably has a thickness ranging from 4 to 10 µm, more preferably 7 to 9 µm. An undercoating layer can be provided between the support and the nonmagnetic layer to enhance adhesion. The undercoating layer preferably has a thickness ranging from 0.005 to 0.5 µm, more preferably 0.01 to 0.5 µm. The magnetic recording medium of the present invention has a nonmagnetic layer and a magnetic layer on one side of the support, as well as can have a backcoat layer on the other side of the support. The backcoat layer preferably has a thickness ranging from 0.1 to 1 µm, preferably from 0.3 to 0.7 µm. Known undercoating layers and backcoat layers can be employed.

In the magnetic recording medium of the present invention, the thickness of the magnetic layer is optimized based on the level of saturation magnetization of the head employed, the head gap length, or the bandwidth of the recording signal. This thickness is preferably 0.03 to 0.2 µm, more preferably 0.1 to 0.15 µm. The magnetic layer can be divided into two or more layers having different magnetic characteristics, in which case known multilayered magnetic layer configurations may be employed. In the magnetic recording medium of the present invention, the nonmagnetic layer preferably has a thickness ranging from 0.2 to 5.0 µm, more preferably 0.3 to 3.0 µm, further preferably 0.5 to 2.5 µm.

[Support]

The support employed in the present invention is preferably nonmagnetic. Known films of the following may be employed as the nonmagnetic support: polyethylene terephthalate, polyethylene naphthalate, other polyesters, polyolefins, cellulose triacetate, polycarbonate, polyamides (including aliphatic polyamides and aromatic polyamides such as aramid), polyimides, polyamidoimides, polysulfones, polybenzooxazoles, and the like. The use of polyethylene naphthalate, polyamides, or some other high-strength support is particularly desirable. As needed, layered supports such as disclosed in Japanese Unexamined Patent Publication (KOKAI) Heisei No. 3-224127 may be employed to vary the surface roughness of the magnetic surface and support surface. These supports may be subjected beforehand to corona discharge treatment, plasma treatment, adhesion enhancing treatment, heat treatment, dust removal, and the like.

In the present invention, the center surface average surface roughness (Ra) of the support as measured by the Mirau method with a TOPO-3D made by WYKO is preferably equal to or less than 8.0 nm, more preferably equal to or less than 5.0 nm. Not only does such a support desirably have a low center surface average surface roughness, but there are also desirably no large protrusions equal to or higher than 0.3 µm. The surface roughness shape may be freely controlled through the size and quantity of filler added to the support as needed. Examples of such fillers are oxides and carbonates of elements such as Ca, Si, and Ti, and organic micropowders such as acrylic-based one. The support desirably has a maximum height $SR_{max}$ equal to or less than 1 µm, a ten-point average roughness $SR_Z$ equal to or less than 0.5 µm, a center surface peak height $SR_P$ equal to or less than 0.5 µm, a center surface valley depth $SR_V$ equal to or less than 0.5 µm, a center-surface surface area percentage SSr of 10 percent to 90 percent, and an average wavelength S $\lambda_a$ of 5 to 300 µm. To achieve desired electromagnetic characteristics and durability, the surface protrusion distribution of the support can be freely controlled with fillers. It is possible to control within a range from 0 to 2,000 protrusions of 0.01 to 1 µm in size per 0.1 mm².

The F-5 value of the support employed in the present invention desirably ranges from 5 to 50 kg/mm², approximately 0.049 to 0.49 GPa. The thermal shrinkage rate after 30 min at 80° C. is preferably equal to or less than 0.5 percent, more preferably equal to or less than 0.2 percent. The breaking strength preferably ranges from 5 to 100 kg/mm², approximately 0.049 to 0.98 GPa.

[Manufacturing Method]

The process for manufacturing the magnetic coating liquid or the nonmagnetic coating liquid comprises at least a kneading step, a dispersing step, and a mixing step to be carried out, if necessary, before and/or after the kneading and dispersing steps. Each of the individual steps may be divided into two or more stages. All of the starting materials employed in the present invention, including the ferromagnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. When a kneader is employed, the ferromagnetic powder or nonmagnetic powder and all or part of the binder (preferably equal to or higher than 30 weight percent of the entire quantity of binder) are kneaded in a range of 15 to 500 weight parts per 100 weight parts of ferromagnetic powder. Details of the kneading process are described in Japanese Unexamined Patent Publication (KOKAI) Heisei Nos. 1-106338 and 1-79274. Further, glass beads may be employed to disperse the magnetic coating liquid and nonmagnetic coating liquid, with a dispersing medium with a high specific gravity such as zirconia beads, titania beads, and steel beads being suitable for use. The particle diameter and fill ratio of these dispersing media can be optimized for use. A known dispersing device may be employed.

Methods such as the following are desirably employed when coating a multilayer structure magnetic recording medium in the present invention. In the first method, the nonmagnetic layer is first applied with a coating device commonly employed to apply magnetic coating liquids such as a gravure coating, roll coating, blade coating, or extrusion coating device, and the magnetic layer is applied while the nonmagnetic layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672. In the second method, the magnetic and nonmagnetic layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672. In the third method, the magnetic and nonmagnetic layers are applied nearly simultaneously using an extrusion coating apparatus with a backup roller as disclosed in Japanese Unexamined Patent Publication (KOKAI) Heisei No. 2-174965. To avoid compromising the electromagnetic characteristics or the like of the magnetic recording medium by aggregation of magnetic particles, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968. In addition, the viscosity of the coating liquid preferably satisfies the numerical range specified in Japanese Unexamined Patent Publication (KOKAI) Heisei No. 3-8471. Applying the nonmagnetic layer, drying it, and then applying the magnetic layer thereover in a sequential multilayer coating to achieve the structure of the magnetic recording medium of the present invention is also possible, and does not compromise the effect of the present invention. However, to reduce the number of voids in the coating and improve the quality as regards dropout and the like, the above-describe simultaneous multilayer coating is preferred.

In the present invention, a known orientation device such as a device sequentially applying a magnetic field with a permanent magnet (for example, rare earth magnet such as a Nd-based one or Sm—Co) and a magnetic field with a solenoid is desirably employed as the orientation device. Calendering is desirably conducted by multiple passages between nips in the form of pairs of metal rolls and rolls of heat-resistant plastic such as epoxy, polyimide, polyamide, and polyimidoamide, or between nips in the form of pairs of metal rolls. In particular, calendering is desirably conducted in the present invention by multiple passages between nips in the form of pairs of metal rolls.

[Physical Properties]

In the magnetic recording medium of the present invention, the saturation flux density of the magnetic layer is desirably equal to or greater than 200 mT and equal to or less than 600 mT when ferromagnetic metal powder is employed. A narrow coercive force distribution is desirable, as is an SFD of equal to or less than 3. Squareness is desirably equal to or greater than 0.8.

It will be readily understood that the physical properties of the nonmagnetic layer and magnetic layer can be varied based on the objective desired in the magnetic recording medium of the present invention.

Embodiments

The specific examples of the present invention will be described below. However, the present invention is not limited to the examples. Further, the "parts" given in the embodiments are weight parts.

Properties of the ferromagnetic powder employed in Embodiments are as follows;

Ferromagnetic Powder

Composition: Fe/Co=70/30 (atom ratio),

Al/Fe=11 atom percent,

Y/Fe=7 atom percent

Hc=195 kA/m (2450 Oe)

Average major axis length=0.08 µm

σs=145 Å·m²/kg (145 emu/g)

Crystallite size=150 Å

Specific surface area by BET method ($S_{BET}$)=53 m²/g

Preparation of magnetic layer coating liquid

| | |
|---|---|
| Ferromagnetic powder | 100 parts |
| Vinyl chloride copolymer | 10 parts |
| MR110 manufactured by Nippon Zeon Co., Ltd. | |
| Polyurethane resin | 3 parts |
| UR8200 manufactured by Toyobo Co., Ltd. | |
| Carbon black | 3 parts |
| #50 manufactured by Asahi Carbon Co., Ltd. | |
| Phenylphosphonic acid | 3 parts |
| Butyl stearate | 2 parts |
| Butoxyethyl stearate | 3 parts |
| Neopentylglycol | 3 parts |
| Stearic acid | 1 part |
| Methyl ethyl ketone | 180 parts |
| Cyclohexanone | 110 parts |

Preparation of nonmagnetic layer coating liquid

| | |
|---|---|
| Nonmagnetic powder α-iron oxide | 100 parts |
| Specific surface area by BET method: 50 m$^2$/g, pH: 10 | |
| Carbon black | 13 parts |
| #950B manufactured by Mitsubishi Chemical Corporation | |
| Vinyl chloride copolymer | 17 parts |
| MR110 manufactured by Nippon Zeon Co., Ltd. | |
| Polyurethane resin | 6 parts |
| UR8200 manufactured by Toyobo Co., Ltd. | |
| Phenylphosphonic acid | 3 parts |
| Butyl stearate (BS) | 3 parts |
| Butoxyethyl stearate (BES) | 4 parts |
| Neopentylglycol (NPG) | 4 parts |
| Oleic acid | 1 part |
| Stearic acid | 1 part |
| Methyl ethyl ketone | 200 parts |
| Cyclohexanone | 50 parts |

Each component of each of the above coating liquids was kneaded in a kneader. The magnetic layer coating liquid was processed for the dispersion time shown in Table 1. To each of the magnetic layer and nonmagnetic layer dispersions obtained was added a paste (SLH160 made by Sumitomo Chemical Co., Ltd.) obtained by dispersing α-alumina (HIT60 made by Sumitomo Chemical Co., Ltd.) in a vinyl chloride copolymer (MR110 made by Nippon Zeon Co., Ltd.) in the quantity, based on α-alumina, given in Table 1. Five parts of polyisocyanate were also added to the magnetic layer dispersion and 13 parts of the same were added to the nonmagnetic layer dispersion. Forty parts of cyclohexanone were added each to the magnetic layer dispersion and to the nonmagnetic layer dispersion. A filter having an average pore size of 3 μm was employed in filtration to complete preparation of the magnetic layer coating liquid and nonmagnetic layer coating liquid.

A polyethylene naphthalate web 8.5 μm thick having a center surface average surface roughness of 4.0 nm and a Young's modulus of 870 kg/mm$^2$ (8.5 GPa) in the width direction was employed as the support. Simultaneous multilayer coating was conducted on one surface of the support by applying in a quantity designed to yield a dry thickness of 2.0 μm the nonmagnetic layer coating liquid obtained and immediately thereafter applying to a magnetic layer thickness of 0.15 μm the magnetic layer coating liquid. While still wet, the coatings were oriented with a Co magnet with a magnetic field intensity of 6,000 Gauss (0.6 T) and a solenoid orientation device of 4,000 Gauss (0.4 T), after which they were dried. Next, a known backcoat layer liquid comprised of carbon black powder and binder was applied to a thickness of 0.5 μm on the other surface of the support. Subsequently, calendering was conducted with the roll configuration and at the temperature shown in Table 1 under conditions of a linear pressure of 300 kg/m and a rate of 200 m/min to prepare sheet samples. These were slit into tape 12.65 mm in width.

The tape manufactured as set forth above was evaluated by the following measurement methods. The results are given in Table 1.

Measurement Methods (1) Microindentation Hardness

The microindentation hardness of the magnetic layer at a load of 6 mgf was measured in a RT environment with a Microindentation Tester ENT-1100a made by Elionix Co.

(2) Number of Surface Protrusions

The number of protrusions from 3 to 7 nm in height per 23,000 μm$^2$ was measured in peak-to-valley mode with a 20-fold object lens under conditions of 2.0-fold zoom magnification, a 0.83 μm high filter, and a 30 μm low filter with a New View 5010 (three-dimensional surface structure analyzing microscope) made by ZYGO Corp.

(3) Head Abrasion, Output, Running Properties

The amount of head abrasion after 100 hours of running in a RT environment and the reproduction output after recording a signal at a wavelength of 0.315 μm were measured with a DTF2 GY-8240 made by Sony. A check was also made for problems with running properties during measurement.

TABLE 1

| | Dispersion time of magnetic coating liquid h | Quantity of abrasive | Calendering condition | | Microindentation hardness kg/mm$^2$ (GPa in parentheses) | Number of surface protrusions | Head abrasion μm | Output dB | Running properties in system |
|---|---|---|---|---|---|---|---|---|---|
| | | | Roll configuration (One is metal and the other is as follows) | Temp. (° C.) | | | | | |
| Embodiment 1 | 4 | 5 | Metal | 80 | 78(0.76) | 66 | 0.8 | +4.3 | No problem |
| Embodiment 2 | 4 | 5 | Metal | 60 | 66(0.65) | 134 | 0.7 | +3.6 | No problem |
| Embodiment 3 | 4 | 5 | Resin | 80 | 43(0.42) | 198 | 0.8 | +3.1 | No problem |
| Embodiment 4 | 4 | 2 | Metal | 80 | 78(0.76) | 70 | 0.5 | +4.4 | No problem |
| Comp. Ex. 1 | 4 | 7 | Metal | 80 | 78(0.76) | 69 | 1.1 | +4.0 | No problem |
| Comp. Ex. 2 | 4 | 1 | Metal | 80 | 78(0.76) | 68 | 0.4 | +4.5 | Substantial debris |
| Comp. Ex. 3 | 4 | 5 | Metal | 90 | 86(0.84) | 43 | 0.6 | 0 | No problem |
| Comp. Ex. 4 | 4 | 5 | Resin | 60 | 34(0.33) | 331 | 0.8 | +1.7 | Substantial debris |
| Comp. Ex. 5 | 1 | 5 | Metal | 80 | 77(0.75) | 258 | 0.6 | +2.2 | No problem |

TABLE 1-continued

| | Calendering condition | | | | | | | |
|---|---|---|---|---|---|---|---|---|
| | Dispersion time of magnetic coating liquid h | Quantity of abrasive | Roll configuration (One is metal and the other is as follows) | Temp. (° C.) | Microindentation hardness kg/mm² (GPa in parentheses) | Number of surface protrusions | Head abrasion μm | Output dB | Running properties in system |
| Comp. Ex. 6 | 8 | 5 | Resin | 80 | 41(0.40) | 35 | 0.7 | +4.5 | Sticking developed and tape moved upwards. |

Embodiment 1

Magnetic liquid was dispersed for 4 hours, 5 parts of abrasive were added per 100 parts of ferromagnetic powder, and calendering was conducted with metal rolls at a temperature of 80° C. This resulted in a microindentation hardness of 78 kg/mm², approximately 0.76 GPa, and a surface protrusion number of 66. The head abrasion was a low 0.8 μm, and output was a high +4.3 dB (relative to Comparative Example 3).

Embodiment 2

Magnetic liquid was dispersed for 4 hours, 5 parts of abrasive were added per 100 parts of ferromagnetic powder, and calendering was conducted with metal rolls at a temperature of 60° C. This resulted in a microindentation hardness of 66 kg/mm², approximately 0.65 GPa, and a surface protrusion number of 134. The head abrasion was a low 0.7 μm. Since calendering was conducted at a lower temperature than in Embodiment 1, the tape was soft and the surface was rough. Although this surface roughness resulted in the output of +3.6 dB lower than in Embodiment 1, output was still high.

Embodiment 3

Magnetic liquid was dispersed for 4 hours, 5 parts of abrasive were added per 100 parts of ferromagnetic powder, and calendering was conducted with metal rolls at a temperature of 80° C. This resulted in a microindentation hardness of 43 kg/mm², approximately 0.42 GPa, and a surface protrusion number of 198. The head abrasion was a low 0.8 u m. Since resin rolls were employed in processing, the tape was softer than that in Embodiment 2 and the surface was rough. Although this surface roughness resulted in a lower output of +3.1 dB, output was still high.

Embodiment 4

Magnetic liquid was dispersed for 4 hours, 3 parts of abrasive were added per 100 parts of ferromagnetic powder, and calendering was conducted with metal rolls at a temperature of 80° C. This resulted in a microindentation hardness of 78 kg/mm², approximately 0.76 GPa, and a surface protrusion number of 70. Head abrasion was an extremely low 0.5 m, and output was a high +4.4 dB.

COMPARATIVE EXAMPLE 1

Magnetic liquid was dispersed for 4 hours, 7 parts of abrasive were added per 100 parts of ferromagnetic powder, and calendering was conducted with metal rolls at a temperature of 80° C. This resulted in a microindentation hardness of 78 kg/mm², approximately 0.76 GPa, and a surface protrusion number of 69. Output was a high +4.0 dB, but head abrasion was a high 1.1 μm.

COMPARATIVE EXAMPLE 2

Magnetic liquid was dispersed for 4 hours, 2 parts of abrasive were added per 100 parts of ferromagnetic powder, and calendering was conducted with metal rolls at a temperature of 80° C. This resulted in a microindentation hardness of 78 kg/mm², approximately 0.76 GPa, and a surface protrusion number of 68. The head abrasion was a low 0.4 μm, and output was a high +4.5 dB. However, the durability of the magnetic layer was poor and there was substantial debris.

COMPARATIVE EXAMPLE 3

Magnetic liquid was dispersed for 4 hours, 5 parts of abrasive were added per 100 parts of ferromagnetic powder, and calendering was conducted with metal rolls at a temperature of 90° C. This resulted in a microindentation hardness of 86 kg/mm², approximately 0.84 GPa, and a surface protrusion number of 43. Since calendering was conducted at the higher temperature of 90° C., despite a smooth surface, the tape surface was excessively hard and head contact tended not to be ensured. Output was a low 0 dB.

COMPARATIVE EXAMPLE 4

Magnetic liquid was dispersed for 4 hours, 5 parts of abrasive were added per 100 parts of ferromagnetic powder, and calendering was conducted with resin rolls at a temperature of 60° C. This resulted in a microindentation hardness of 34 kg/mm², approximately 0.33 GPa, and a surface protrusion number of 331. Since the calendering temperature was lower than in Embodiment 3, the tape became soft and the surface was rough. Due to the extreme roughness, output was a low +1.7 dB. The excessive softness of the tape also generated substantial debris.

COMPARATIVE EXAMPLE 5

Magnetic liquid was dispersed for 1 hour, 5 parts of abrasive were added per 100 parts of ferromagnetic powder, and calendering was conducted with metal rolls at a temperature of 80° C. This resulted in a microindentation hardness of 77 kg/mm², approximately 0.75 GPa, and a surface protrusion number of 258. Since the magnetic liquid dispersion time was shorter than in Embodiment 1, the surface was rough, with equivalent tape hardness. The roughness resulted in a low output of +2.2 dB.

COMPARATIVE EXAMPLE 6

Magnetic liquid was dispersed for 8 hours, 5 parts of abrasive were added per 100 parts of ferromagnetic powder, and calendering was conducted with resin rolls at a temperature of 80° C. This resulted in a microindentation hardness of 41 kg/mm$^2$, approximately 0.40 GPa, and a surface protrusion number of 35. Since the magnetic liquid dispersion time was longer than in Embodiment 3, the surface was extremely smooth, with equivalent tape hardness. The smoothness resulted in an extremely high output of +4.5 dB, but sticking developed and tape moved upwards in the running system, causing damage.

Since the magnetic recording medium of the present invention has excellent head abrasion characteristics and good head contact, it is suitable for use in the recording and reproduction system in which high data transmission rates are required.

The present disclosure relates to the subject matter contained in Japanese Patent Application No. 2003-323211 filed on Sep. 16, 2003, which is expressly incorporated herein by reference in its entirety.

What is claimed is:

1. A magnetic recording medium comprising a nonmagnetic layer comprising a nonmagnetic powder and a binder and a magnetic layer comprising a ferromagnetic powder and a binder in this order on a support, wherein said magnetic layer comprises an abrasive in a quantity of 2 to 5 weight percent with respect to the ferromagnetic powder, the number of protrusions having a height of 3 to 7 nm per 23,000 μm$^2$ of a surface of the magnetic layer, measured by a non-contact three-dimensional structure analyzing microscope, ranges from 50 to 200, and said magnetic layer has a microindentation hardness ranging from 40 to 80 kg/mm$^2$ at a load of 6 mgf.

2. The magnetic recording medium according to claim 1, wherein said magnetic layer comprises an abrasive in a quantity of 3 to 4 weight percent with respect to the ferromagnetic powder.

3. The magnetic recording medium according to claim 1, wherein the number of protrusions having a height of 3 to 7 nm per 23,000 μm$^2$ of a surface of the magnetic layer, measured by a non-contact three-dimensional structure analyzing microscope, ranges from 70 to 150.

4. The magnetic recording medium according to claim 1, wherein said magnetic layer has a microindentation hardness ranging from 50 to 70 kg/mm$^2$ at a load of 6 mgf.

5. The magnetic recording medium according to claim 1, wherein said magnetic layer has a thickness ranging from 0.03 to 0.2 μm.

6. The magnetic recording medium according to claim 1, wherein said magnetic layer has a thickness ranging from 0.1 to 0.15 μm.

* * * * *